June 18, 1935.   D. D. PEEBLES   2,005,238
METHOD OF MANUFACTURING DRIED FOOD PRODUCTS
Filed Jan. 6, 1932
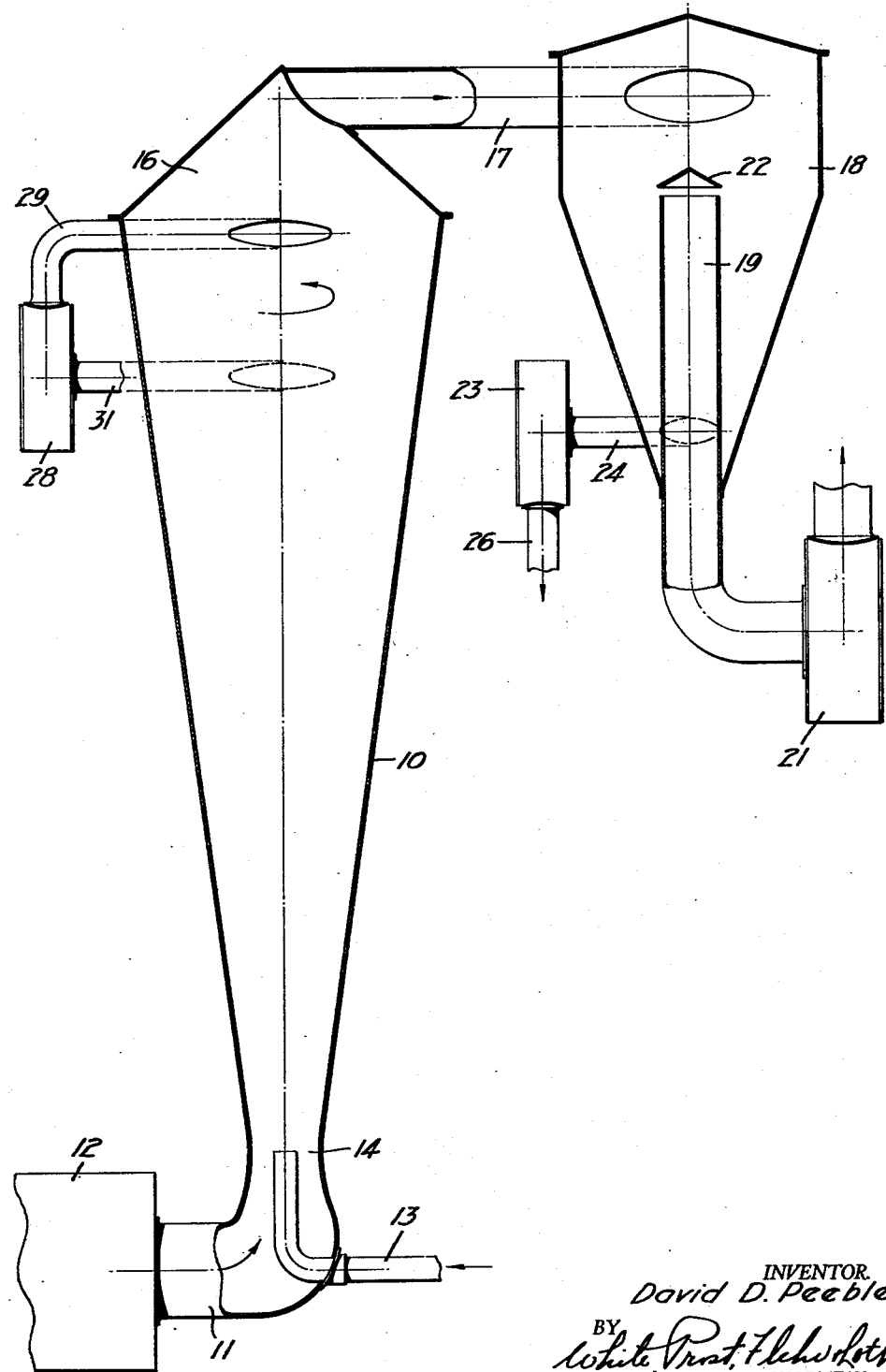
INVENTOR.
David D. Peebles
BY
ATTORNEYS.

Patented June 18, 1935

2,005,238

UNITED STATES PATENT OFFICE 2,005,238

METHOD OF MANUFACTURING DRIED FOOD PRODUCTS

David D. Peebles, Eureka, Calif.

Application January 6, 1932, Serial No. 584,914

1 Claim. (Cl. 99—5)

This invention relates generally to methods of manufacturing dried food products, from materials such as tubers.

The drying of certain vegetables and fruits has long been practiced in the art, to produce products valuable as a stock feed or for human consumption. Dehydration of such materials not only effects preservation, but also makes possible a considerable saving in weight. The dehydration may be carried on in a crude way by spreading the material upon trays exposed to the sun, or by passing the material through tunnel dryers. There are certain materials, namely tubers, which are of such a character that their dehydration has not been carried out commercially, although they are relatively high in nutritive value. For example, it has been difficult to remove the moisture from carrots by known methods, to produce a marketable product. Even though one might succeed in effecting dehydration by known methods, the resulting product would be practically unfit as a food for stock or for human consumption, due largely to the hardness of the product, and to the reluctance with which it would reabsorb water.

It is an object of the present invention to devise a practical commercial process for the manufacture of valuable food products from tubers, as for example, carrots, beets, turnips, potatoes and the like.

It is a further object of the invention to devise a dehydration process which will cause the least possible injury to the material being dried, and which will result in a nutritive and palatable product which will readily reabsorb water.

Further objects of the invention will appear from the following description in which the preferred embodiment of my process has been set forth in detail in conjunction with the accompanying drawing. It is to be understood that the appended claim is to be accorded a range of equivalents consistent with the state of the prior art.

My invention can be outlined briefly as comprising the steps of reducing the material to be dehydrated to such a physical form that it can be suspended in currents of drying gas and can be handled without formation of agglomerated masses. The form to which the material is reduced can aptly be termed shreds or shavings. The shredded material is then contacted with the drying gas in such a manner as to effect efficient removal of moisture. Further details of my method can best be explained after an explanation of the details of the dehydrating apparatus illustrated in the single figure of the drawing. This apparatus consists of a treatment chamber 10, which can be circular in cross section and which is tapered or conical shaped with the end of largest cross sectional area uppermost. A drying gas is introduced into the lower end of chamber 10 through a conduit 11, and this gas can conveniently be air heated by furnace 12. The shredded material to be dehydrated, as for example fresh shredded carrots, can be conveyed pneumatically through pipe 13, and introduced into lower portion of chamber 10 within the restricted throat 14. A closure 16 extends over the upper end of chamber 10, and a conduit 17 connects this closure with a centrifugal separator 18.

Separator 18 is illustrated as being of the down draft type, having an air exhaust conduit 19 extending downwardly through its lower end. The outer end of conduit 19 is shown connected to the inflow side of a fan 21. The inner end of conduit 19 is shown disposed below a conical baffle 22. Removal of separated solid materials from separator 19 can be accomplished pneumatically through the use of a fan 23. This fan has its inflow side connected to the lower portion of separator 18 through conduit 24. The outflow conduit 26 from fan 23 can lead to further separating means.

Before proceeding with the description of my method, it may be explained that material introduced into the lower portion of chamber 10, as for example shreds of fresh carrots, is caught up by the drying gas introduced by way of conduit 11, and is progressed upwardly in suspension with the gas. As the material progresses upwardly in chamber 10, the velocity of the gas tending to move it upwardly decreases proportionately, because of the increased cross sectional area of chamber 10. The velocity of gas adjacent the upper end of chamber 10 is insufficient to suspend and carry through conduit 17, a shred of which is of insufficient dryness. Therefore, the shreds remain in chamber 10 until they are dehydrated to the degree desired, after which they are sufficiently light to be carried out through conduit 17 with the gas. From this explanation it is apparent that the apparatus operates not only as a dehydrator, but likewise as a classifier to automatically prevent the discharge of material until the proper dryness has been attained. Likewise certain shreds which may contain more moisture than others, or which may not give up their moisture as readily as others, will be treated for a longer period of time within the chamber.

In actual operation it has been found that the velocity of certain shreds entering by way of pipe 13, may be so great as to propel them through the chamber without proper treatment with the drying gas. It has been found possible to obviated this difficulty by causing the formation of swirling gas currents in the upper portion of the chamber. For this purpose, there is shown a fan 28, having its discharge conduit 29 connected tangentially with the upper portion of chamber 10, and having its inflow conduit 31 likewise connected tangentially with chamber 10 at a point spaced below the point of communication of conduit 29. The arrangement of pipes 29 and 31 is such that currents of gas introduced into the chamber by way of pipe 29 need not change the direction of swirling upon entering pipe 31. The swirling zone of gas in the upper portion of chamber 10 by this return circuit, effectively possesses particles of ungraded material from being propelled upwardly through the treatment chamber. If such particles are propelled upwardly, upon entering the swirling zone created by the closed circuit, they are caused to lose their upward velocity, and are then treated substantially the same as other particles.

While it is believed that the above described apparatus can be readily constructed and successfully operated by those skilled in the art, it may be explained that good results have been secured in practice, in the dehydration of shredded carrots, by utilizing an inflow of air in chamber 10 at a temperature of about 450° F., with a corresponding outflow temperature in conduit 17 of about 180° F.

In further explanation of the general method claimed herein, in manufacturing a dehydrated product from tubers like carrots, the fresh carrots are passed through a suitable machine which reduces them to relatively fine shreds. These shreds are preferably relatively thin compared to their width, and their length may be many times their width. In fact their thickness should be as small a dimension as can be practically obtained by a shredding machine, without producing a shred of such extreme thinness as not to remain intact. In this connection it is well to note that tubers, like carrots have a fibrous structure which makes possible relatively fine shredding. In practice the shreds which I produce from carrots are of paper-like thinness.

The wet shreds produced from carrots are peculiar in that they do not tend to agglomerate together, but are readily separated apart when introduced into an air blast. Furthermore, it is possible to convey such shreds pneumatically through a conduit or pipe, thus enabling me to introduce them into the treatment chamber 10 through the conduit 13. It should be noted at this point that if the carrots were ground, the resulting material could not be treated according to my method. Such wet ground material could not be conveyed pneumatically, and it could not be placed in suspension with the drying gas. On the other hand, wet shreds of carrots, because of their physical shape, readily separate apart, and are peculiarly adapted to be suspended and floated upwardly by gas currents. After reducing the fresh carrots to shredded form, as has been explained above, they are introduced into the apparatus described above by way of pipe 13. The product recovered from conduit 26 is dried to the point of being somewhat brittle, although its general shredded form is still retained. Moisture content of the final product will vary from say 5% to 12%. Dominant characteristics of the finished product are that it retains the natural flavor and nutritive properties of the fresh carrots, it is not discolored by the process, and it readily reabsorbs water. It can be utilized as a stock feed or food for human consumption, either without or after soaking in water.

While I have indicated my process as applicable to a number of different materials, its application to fresh carrots is particularly desirable, since among other reasons it makes possible a product of high vitamine content.

I claim:

In a method for producing a dried food product from materials like tubers, the steps of shredding the fresh tubers to form shreds having a paper-like thinness, introducing the fresh shreds into the lower portion of a treatment chamber, effecting suspension of the shreds within the treatment chamber in an upwardly-moving expanding column of drying gas, the gas being of gradually diminishing velocity, removing the desiccated shreds from the upper portion of the chamber together with the drying gas, and then separating the shreds from the gas.

DAVID D. PEEBLES.